United States Patent
Cheng et al.

(10) Patent No.: US 8,842,616 B2
(45) Date of Patent: Sep. 23, 2014

(54) METHOD, NETWORK DEVICE AND SYSTEM FOR DETERMINING RESOURCE MAPPING IN COORDINATED MULTI-POINT TRANSMISSION

(75) Inventors: Xingqing Cheng, Beijing (CN); Lei Wan, Beijing (CN); Mingyu Zhou, Beijing (CN); Yajun Zhao, Beijing (CN); Xiaotao Ren, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 192 days.

(21) Appl. No.: 13/112,736

(22) Filed: May 20, 2011

(65) Prior Publication Data
US 2011/0235603 A1    Sep. 29, 2011

Related U.S. Application Data

(63) Continuation of application No. PCT/CN2009/075493, filed on Dec. 11, 2009.

(30) Foreign Application Priority Data

Jan. 6, 2009 (CN) .......................... 2009 1 0002373

(51) Int. Cl.
*H04W 4/00*    (2009.01)
*H04L 5/00*    (2006.01)

(52) U.S. Cl.
CPC ............ *H04L 5/0053* (2013.01); *H04L 5/0035* (2013.01); *H04L 5/0032* (2013.01)
USPC ............ 370/329; 370/330; 370/331; 370/338

(58) Field of Classification Search
USPC ...................... 455/422.1, 435, 436, 437, 438; 370/310, 328–331, 342, 349, 350
See application file for complete search history.

(56) References Cited

U.S. PATENT DOCUMENTS

| 5,961,601 A | 10/1999 | Iyengar |
| 2003/0212887 A1 | 11/2003 | Walther et al. |

(Continued)

FOREIGN PATENT DOCUMENTS

| CN | 1710902 A | 12/2005 |
| CN | 1905546 A | 1/2007 |

(Continued)

OTHER PUBLICATIONS

Written Opinion of the International Searching Authority issued in corresponding PCT Patent Application No. PCT/CN2009/075493, mailed Mar. 25, 2010.

(Continued)

*Primary Examiner* — Kibrom T Hailu
*Assistant Examiner* — Zewdu A Beyen
(74) *Attorney, Agent, or Firm* — Brinks Gilson & Lione

(57) ABSTRACT

A method, a network device, and a system for determining resource mapping in CoMP transmission are disclosed. The method includes: the cooperative cells that perform CoMP transmission for a UE negotiate a mapping rule used by the cooperative cells when the status of the CoMP transmission of the UE changes, where the mapping rule includes the number of and position of OFDM symbols allocated to a PDCCH domain and/or a data channel domain; and the negotiated mapping rule is notified to the UE. In this embodiment, before the downlink signals are transmitted, the mapping rule used by each cooperative cell for CoMP transmission is negotiated between the cooperative cells, and therefore, the UE can accurately receive the signal sent by multiple cooperative cells and the performance of CoMP transmission in the system is improved.

22 Claims, 7 Drawing Sheets

(56) References Cited

U.S. PATENT DOCUMENTS

| | | |
|---|---|---|
| 2003/0233361 A1 | 12/2003 | Cady |
| 2004/0181598 A1 | 9/2004 | Paya et al. |
| 2005/0154873 A1 | 7/2005 | Cam Winget et al. |
| 2006/0120477 A1 | 6/2006 | Shen et al. |
| 2007/0254596 A1 | 11/2007 | Corson et al. |
| 2007/0288743 A1 | 12/2007 | Cam Winget et al. |
| 2010/0027471 A1* | 2/2010 | Palanki et al. ............... 370/328 |

FOREIGN PATENT DOCUMENTS

| | | |
|---|---|---|
| CN | 1906883 A | 1/2007 |
| CN | 101075843 A | 11/2007 |
| CN | 101095296 A | 12/2007 |
| CN | 101128056 A | 2/2008 |
| CN | 101296463 A | 10/2008 |
| CN | 101299745 A | 11/2008 |
| WO | WO 2008001977 A1 | 1/2008 |
| WO | WO 2008096833 A1 | 8/2008 |

OTHER PUBLICATIONS

International Search Report issued in corresponding PCT Patent Application No. PCT/CN2009/075493, mailed Mar. 25, 2010.

Office Action issued in corresponding Chinese Patent Application No. 200810065487.6, mailed Dec. 13, 2011.

Extended European Search Report issued in corresponding European Patent Application No. 09827195.0, mailed Dec. 23, 2011.

ETRI, "Coordinated Multi-Cell Transmission for LTE-Advanced Downlink" Agenda Item 12. 3GPP TSG RAN WG1 Meeting #54, Jeju, South Korea. Aug. 18-22, 2008. R1-082896.

$3^{rd}$ Generation Partnership Project, "Technical Specification Group Radio Access Network; Physical Layer Aspects for Evolved UTRA" (Release 7). 3GPP TR 25.814, V1.1.1, Feb. 2006.

Search Report issued in corresponding Chinese Patent Application No. 200910002373.1, mailed Jul. 26, 2012.

Alcatel Shanghai Bell et al., "Collaborative MIMO for LTE-Advanced Downlink" Agenda Item 12, 3GPP TSG RAN WG1 Meeting #54. Jeju, Korea, Aug. 18-22, 2008. R1-082812.

Motorola, "LTE—A Multiple Point Coordination and Its Classification" Agenda Item 12, TSG-RAN WG1 #54. Jeju, South Korea, Aug. 18-22, 2008. R1-083229.

Nortel, "Cell Clustering for CoMP Transmission/Reception" Agenda Item 11.4, 3GPP TSG-RAN Working Group 1 Meeting #55. Prague, Czech Republic, Nov. 10-14, 2008. R1-084464.

LG Electronics, "Network MIMO in LTE-Advanced" Agenda Item 12, 3GPP TSG RAN WG1 Meeting #54. Jeju, South Korea, Aug. 18-22, 2008. R1-082942.

LG Electronics, "Consideration on CoMP in LTE-Advanced" Agenda Item 11.4, 3GPP TSG WG1 Meeting #55. Prague, Czech Republic, Nov. 10-14, 2008. R1-084203.

\* cited by examiner

US 8,842,616 B2

METHOD, NETWORK DEVICE AND SYSTEM FOR DETERMINING RESOURCE MAPPING IN COORDINATED MULTI-POINT TRANSMISSION

CROSS-REFERENCE TO RELATED APPLICATIONS

This application is a continuation of International Application No. PCT/CN2009/075493, filed on Dec. 11, 2009, which claims priority to Chinese Patent Application No. 200910002373.1, filed on Jan. 6, 2009, all of which are hereby incorporated by reference in there entireties.

FIELD OF THE INVENTION

The present invention relates to the wireless communications field, and in particular, to a method, a network device, and a system for determining resource mapping in Coordinated Multi-Point (CoMP) transmission.

BACKGROUND OF THE INVENTION

In a wireless communication system, in order to improve the downlink transmission performance of a User Equipment (UE) at the edge of a cell, the downlink Coordinated Multi-Point transmission (CoMP) in the CoMP technology may be applied. That is, multiple cells work jointly to send signals to the same UE in order to improve the signal to interference-and-noise ratio of the signal received by the UE or enhance the throughput of the system. Multiple cells that send signals to the same UE through CoMP transmission are called cooperative cells.

In the process of researching and practicing the prior art, the inventor of the present invention finds at least the following defects in the prior art:

In the prior art, the UE is probably unable to correctly receive the downlink signals sent by multiple cooperative cells through CoMP transmission.

SUMMARY OF THE INVENTION

The embodiments of the present invention provide a method, a network device, and a system for determining resource mapping in CoMP transmission so that the UE can accurately receive the signals sent by multiple cooperative cells.

The embodiments of the present invention are based on the following technical solution:

A method for determining resource mapping in CoMP transmission includes:

negotiating a mapping rule used by cooperative cells that perform CoMP transmission for a UE when a status of the CoMP transmission of the UE changes, where the mapping rule includes the number of and the positions of Orthogonal Frequency Division Multiplexing (OFDM) symbols allocated to a PDCCH domain and/or a data channel domain; and notifying the negotiated mapping rule to the UE.

A network device includes:

a negotiating unit, adapted to negotiate a mapping rule used by cooperative cells that perform CoMP transmission for a UE when a status of the CoMP transmission of the UE changes, where the mapping rule includes the number of and the positions of OFDM symbols allocated to a PDCCH domain and/or a data channel domain; and a notifying unit, adapted to notify the mapping rule negotiated by the negotiating unit to the UE.

A communication system comprises:

a network device, adapted to: negotiate a mapping rule used by cooperative cells that perform CoMP transmission for a UE when a status of the CoMP transmission of the UE changes, where the mapping rule includes the number of and the positions of OFDM symbols allocated to a PDCCH domain and/or a data channel domain, and notify the negotiated mapping rule UE.

The foregoing technical solution reveals that: In an embodiment of the present invention, before the downlink signals are transmitted, the mapping rule used for CoMP transmission is negotiated between cooperative cells, and therefore, the UE can accurately receive the signals sent by multiple cooperative cells and the performance of CoMP transmission in the system is improved.

BRIEF DESCRIPTION OF THE DRAWINGS

To illustrate the technical solution under the present invention more clearly, the accompanying drawings for describing the embodiments of the present invention are given briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In the prior art, the main reasons why the UE is probably unable to correctly receive the downlink signals sent by cooperative cells through CoMP transmission are as follows:

The PDCCH domain and the downlink data channel domain of the cooperative cells occupy different OFDM symbols in the downlink signals. The first n OFDM symbols are occupied by the PDCCH domain and used to transmit downlink control signaling; the OFDM symbols except the first n OFDM symbols are occupied by the downlink data channel and used to transmit downlink data; and the number of and the positions of OFDM symbols occupied by the PDCCH domain and the downlink data channel domain may be included in the mapping rule of physical resources.

Because each cooperative cell can determine the number of OFDM symbols for transmitting downlink control signaling according to the factors such as traffic of this cell, the number of OFDM symbols used by the downlink data channel domain may vary according to cooperative cells. In the prior art, the mapping rule of the cooperative cells is not negotiated before the downlink signals are transmitted, and therefore, the UE is unable to receive downlink signals correctly and the CoMP transmission performance of the system is deteriorated.

The embodiments of the present invention are put forward to solve the problems in the prior art.

The following detailed description is directed to the technical solution of the present invention with reference to the accompanying drawings. However, the embodiments to be described are only part of, rather than all of, the embodiments of the present invention. Additionally, all other embodiments, which can be derived by those skilled in the art from the embodiments given herein without any creative efforts, fall within the scope of the present invention.

Network nodes in a CoMP system include: evolved Node B (eNodeB) and one or more Access Points (AP). An AP is a node that includes at least a radio frequency transceiver, and one or more antenna elements can be configured in an AP. Multiple APs are distributed geographically and connected to the eNodeB. Multiple APs may coordinate to transmit or receive data. The cooperative APs may come from the same eNodeB or different eNodeB's.

The relation between the AP and the cell may be: One cell includes one AP or more APs, namely, one or more APs serve the same UE. For ease of description, the following embodiments assume that one cell includes one AP. Evidently, when one cell includes more APs, each AP can also implement the embodiments of the present invention.

Embodiment 1

Figure 1:
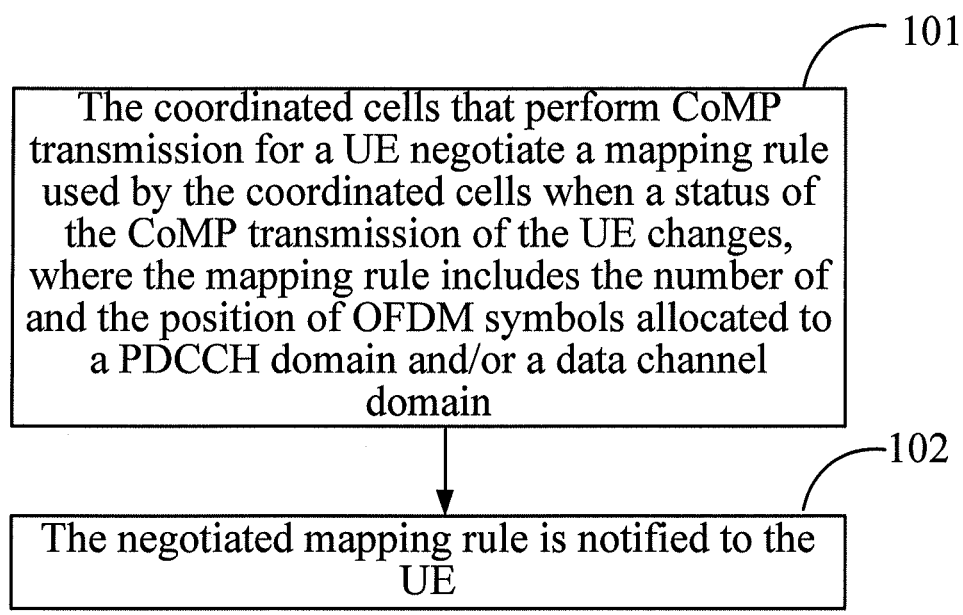
FIG. 1 is a flowchart of a method in Embodiment 1 of the present invention.

FIG. 1 is a flowchart of a method in this embodiment. As show in FIG. 1, the method includes the following steps:

Step 101: The cooperative cells that perform CoMP transmission for a UE negotiate the mapping rule used by the cooperative cells when the status of the CoMP transmission of the UE changes, where the mapping rule includes the number of and the positions of OFDM symbols allocated to a PDCCH domain and/or a data channel domain.

The change of the CoMP transmission status of the UE includes: the UE change from a non-CoMP state to a CoMP state, or change from a CoMP state to a non-CoMP state.

Therefore, the change of the CoMP transmission status of UE includes: the UE in a CoMP state cell which is in a CoMP state changes to a non-CoMP state, the UE in a non-CoMP state cell which is in the CoMP state changes to a CoMP state, and the UE in a non-CoMP state cell which is in the non-CoMP state changes to a CoMP state. The cooperative cells may negotiate the coordination mode used for CoMP transmission, including coordination of physical resources and coordination of the receiving and transmitting mechanism.

The coordination mode of physical resources may be fixed or variable. When the physical resources mapped by a cooperative cell are fixed, the data domain of the cooperative cell uses the physical resources except the physical resources used by the control channel symbols. The number of the control channel symbols is the maximum possible number of symbols occupied by a Physical Downlink Control Channel (PDCCH). That is, all or part of the physical resources except those allocated to the PDCCH domain are allocated to the data channel domain.

When the physical resources mapped by the cooperative cell are variable, the cooperative cells need to negotiate the selected physical resource coordination mode before each attempt to transmit the downlink signal. The physical resource coordination modes available for selection to the cooperative cell include: using all physical resources of the cooperative cell for coordination, using the corresponding physical resources of the UE in the cooperative cell for coordination, or using the physical resources specified for the exclusive purpose of CoMP transmission in the cooperative cell for coordination. Selection of any physical resource coordination mode is appropriate for implementing the embodiments of the present invention. In addition, after the resource coordination mode changes, the change may be notified to the UE, and/or to the cooperative cells that perform CoMP transmission for the UE. Specifically, the change is notified to the UE through a PDCCH or broadcast channel.

A receiving and transmitting mechanism includes a code modulation mode and a multi-antenna application mode (diversity mode, multiplexing mode).

The negotiation of the mapping rule further includes negotiation of the sending mode of the Reference Signal (RS) of each cooperative cell. RSs include Common Reference Signal (CRS) and/or Dedicated Reference Signal (DRS), and correspond to CoMP-ID, UE-ID, anchor cell ID, serving cell ID, or any combination thereof.

The negotiation of the mapping rule further includes negotiation of the code rate matching scheme used by each cooperative cell. The negotiation of the code rate matching scheme involves the following scenarios:

(a) If all cooperative cells have the same number of and the same positions of Resource Elements (RE) that can send data, the same code rate matching scheme is applied.

(b) If the cooperative cells have different number of and/or different positions of the REs that can send data, the same code rate matching scheme is applied, and then the mode of mapping from the rate-matched symbol to the physical resource is decided according to the mapping relation of REs and/or the number of REs that can send data in the cooperative cell.

(c) If the cooperative cells have different number of and/or different positions of the REs that can send data, the same code rate matching scheme is applied, and then the mode of mapping from the rate-matched symbol to the physical resource is decided according to the mapping relation of REs and/or the number of REs that can send data in the cooperative cell. For the data corresponding to the REs that involve no mapping relation between cooperative cells, the data is matched in the corresponding cross mode, duplicate mode, or puncture mode.

(d) If the cooperative cells use different code rate matching schemes, each cooperative cell uses a different mode of mapping from the rate-matched symbol to the physical resource.

The negotiation method may be: The same mapping rule is applied to all cooperative cells; or any other negotiation method that enables normal communication between the cooperative cells is applied.

Step 102: Notify the negotiated mapping rule to the UE.

The cooperative cells probably use different mapping rules, which makes the UE unable to read the downlink data in the downlink signals after receiving the downlink signals sent by the cooperative cells. Therefore, the cooperative cells need to negotiate the mapping rule and notify the mapping rule to the UE before sending the downlink signals. The notification may be sent through a PDCCH or broadcast channel.

The downlink data transmitted by different cooperative cells may be the same data, which enhances the strength of the signals received by the UE; or, the downlink data transmitted by different cooperative cells may be different so that the UE can receive multiple channels of signals.

In this embodiment, before the downlink signals are transmitted, the mapping rule used for CoMP transmission is negotiated between cooperative cells, and therefore, the UE can accurately receive the data sent by multiple cooperative cells and the performance of CoMP transmission in the system is improved.

If the physical resource occupied by the RS varies according to the cooperative cells but the same transmission block is sent, the rule of mapping from the transmission block to the physical resource may be as follows:

(1) The mapping rule of the anchor cell serves as the basic rule, and other cooperative cells comply with the same rule. It is assumed that cell 1 is an anchor cell. That is, if data is sent from a position of cell 1, data is also sent from a counterpart position of cell 2. In this case, no information is sent from the remaining positions in the cooperative cells except the anchor cell, or other specified supplementary information such as RS, Hybrid Automatic Repeat Request (HARQ) or duplicate of data is sent from the remaining positions in the cooperative cells except the anchor cell. In order to enhance signals, it is best to send the same data from the counterpart positions of cell 1 and cell 2, the weight factor may be the same or not. Alternatively, data is sent from the corresponding time-frequency resource positions of all cooperative cells, including the position of the RS.

The anchor cell may be preset by the system, or allocated dynamically by NodeB according to the status of the service or channel; and the anchor cell may be a cell from which the UE receives control signaling, or a cell selected by the UE according to a principle.

(2) The REs in the counterpart time-frequency position of the cooperative cells send the same data, and the rule applied to the position occupied by the RS depends on the characteristics of the RS of the cooperative cell: If the cooperative cell has a corresponding RS, this RS is paired with the corresponding RE for sending the same data, or no data is sent from the position occupied by this RS; if the cooperative cell has no corresponding RS, the cooperative cell that sends no RS may send data or not in the counterpart position of sending the RS in other cooperative cells.

For example, as regards a counterpart position corresponding to the RS of one cooperative cell, no data is sent from the counterpart position of other cooperative cells, and more specifically, as regards a counterpart position corresponding to the RS of cell 1, no data is sent from the counterpart position of cell 2; as regards a counterpart position corresponding to the RS of cell 2, no data is sent from the counterpart position of cell 1; as regards other positions, the same mapping rule applies. In order to enhance signals, it is best to send the same data from the counterpart positions of cell 1 and cell 2, and the weight factor may be different.

(3) No data is sent from the counterpart position corresponding to the RS of the cooperative cell, and data is sent from the remaining positions not corresponding to the RS. However, depending on the available physical resources, the mapping rule may vary. The following description takes cell 1 and cell 2 as an example.

For example, if the RSs of cell 1 occupy more positions in contrast to cell 2, the physical resource for sending data varies according to the two cells, but the sent transmission blocks are the same. The solution is as follows:

As regards a counterpart position corresponding to the RS of one cell, data may be sent from the counterpart position of the other cell. For example, if the RS of a symbol is in a corresponding relation, cross sending is performed on the data; if the RS of a symbol is not in a corresponding relation, the data is sent in only one cell, the signals are enhanced in the counterpart position of the remaining cells, and the same signal may be sent in the cooperative cells except for the weight factor.

The Long Term Evolution (LTE) technology defines a Multicast Broadcast Single-Frequency Network (MBSFN) subframe for the exclusive purpose of broadcast or multicast. The CoMP transmission may use the MBSFN subframe for transmission, or use another subframe whose mapping rule is the same as the mapping rule of the MBSFN subframe. However, because the MBSFN subframe is exclusively designed for broadcast or multicast, the MBSFN subframe may be extended to an enhanced special subframe adaptive to the characteristics of CoMP transmission.

In this embodiment, the existing MBSFN subframe may be applied, or the existing MBSFN subframe is extended. The methods of extending the existing MBSFN subframe may include:

1. Prolong the length of the Cyclic Prefix (CP) used by the existing MBSFN subframe. A long CP, longer CP, or normal CP may be applied. A longer CP refers to a CP of a subframe whose carrier interval is 7.5K. The length of the CP used by the corresponding uplink subframe may be indicated in an upper-layer signaling such as broadcast signaling. The vacant part caused by use of different CPs may be filled with supplementary information.

2. Increase the OFDM symbols occupied by the PDCCH in the existing MBSFN subframe, for example, increase the existing 0-2 OFDM symbols to 1-3 OFDM symbols or 1-4 OFDM symbols.

3. Increase the density of RS patterns and pilot frequencies in the existing MBSFN subframe. When the density of pilot frequencies of the existing MBSFN subframe is too high, the density may be reduced properly, and the positions of the pilot frequencies are flexibly moveable.

4. Extend the PDCCH of the existing MBSFN subframe, and send the relevant scheduling information in the PDCCH, including the scheduling information for transmitting downlink data, scheduling information for transmitting the uplink data, and the uplink power control command.

5. Increase the uplink subframes corresponding to the MBSFN (or enhanced MBSFN) subframes. For example, add one bit to the upper-layer signaling (such as broadcast information) and/or the control channel for indicating whether the corresponding uplink subframe uses a long CP or longer CP or normal CP.

6. Change the rule of mapping from a transmission block to a physical resource block according to the change of the characteristics of the MBSFN subframe. With the change of the PDCCH or the density of pilot frequencies, the physical resources available to the data change, and the mapping rule changes accordingly.

The foregoing method is also applicable to non-backhaul transmission of the relay scenario, and the change of the mapping rule needs to be notified to the UE, or the type of the subframe used by each cooperative cell is notified to the UE.

In Embodiment 2 below, the first cooperative cell and the second cooperative cell are unified into the same mapping rule when the mapped physical resource of the cooperative cell is variable. It is assumed that the unification is: The OFDM symbol allocated to the PDCCH domain is the same. In the following embodiments 2-4, the first cooperative cells mentioned in Embodiment 1 is an execution entity. The first cooperative cell is the cooperative cell in which the number of OFDM symbols allocated to the PDCCH domain is less than that in other cooperative cells. Nevertheless, if the number of OFDM symbols in the first cooperative cell is greater than that in other cooperative cells, the first cooperative cell does not need to modify the OFDM symbols, namely, the mapping rule corresponding to the OFDM symbol of the first cooperative cell is directly used as the mapping rule of the first cooperative cell.

Embodiment 2

Figure 2:
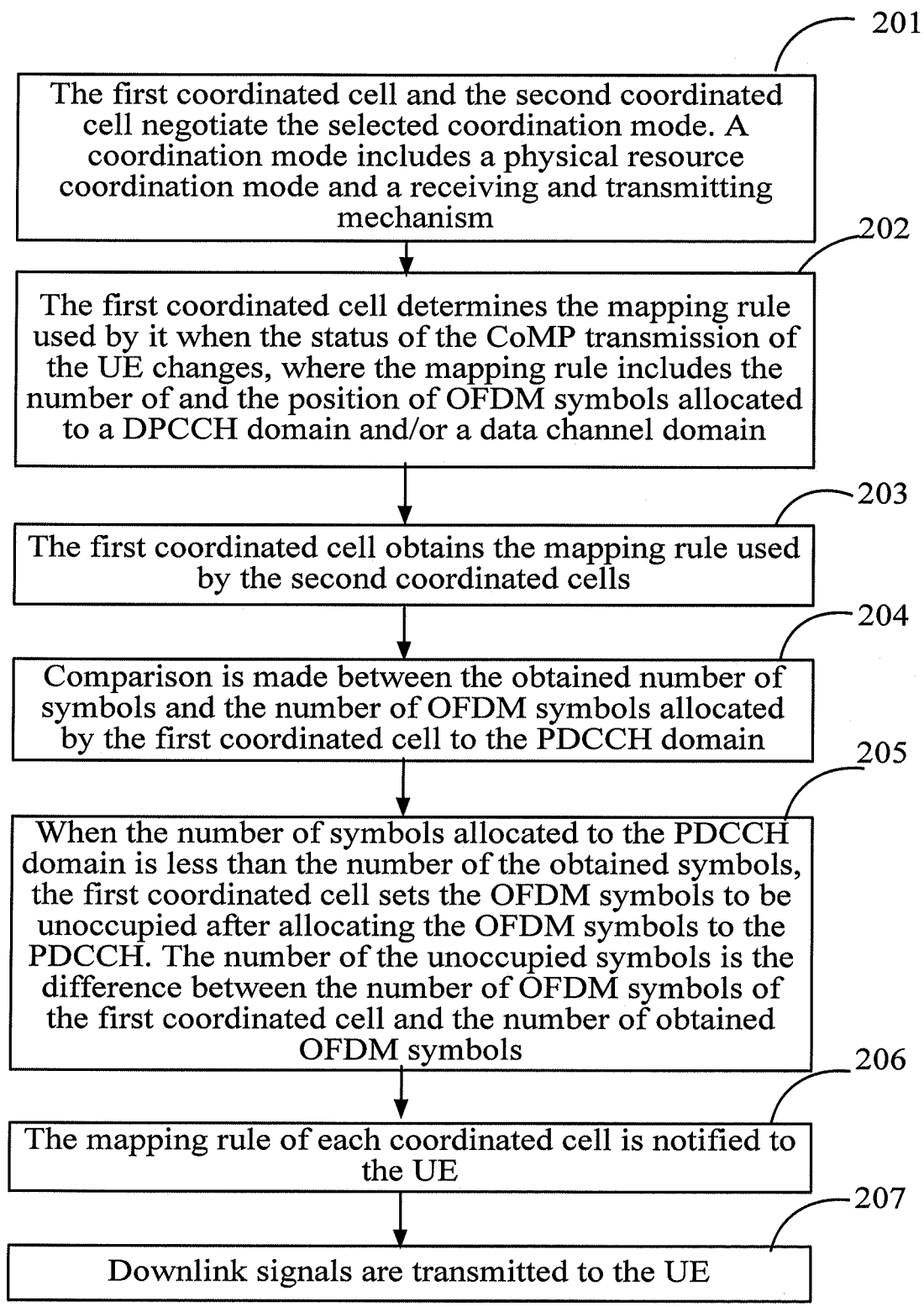
FIG. 2 is a flowchart of a method in Embodiment 2 of the present invention.

FIG. 2 is a flowchart of a method in this embodiment. As shown in FIG. 2, embodiment 2 includes:

Step 201: The first cooperative cell and the second cooperative cell negotiate their respective selected coordination modes. A coordination mode includes a physical resource coordination mode and a receiving and transmitting mechanism.

The physical resource coordination modes available for selection to the cooperative cell include: using all physical resources of the cooperative cell for coordination, using the corresponding physical resources of the UE in the cooperative cell for coordination, or using the physical resources specified for the exclusive purpose of CoMP transmission in the cooperative cell for coordination. Selection of any physical resource coordination mode is appropriate for implementing the embodiments of the present invention. A receiving and transmitting mechanism includes a code modulation mode and a multi-antenna application mode (diversity mode, multiplexing mode).

After the physical resource coordination mode is negotiated, further negotiation may be performed to allocate all or part of the physical resources, except the physical resource allocated to the PDCCH domain, to the data channel domain.

The negotiation may be: one or more coordinate cells notify their respective selected coordinate modes to each other, or a negotiation mode is unified.

After completion of negotiation, the negotiated coordination mode may be notified to the UE, and/or to all cooperative cells that perform CoMP transmission for the UE. In this embodiment, it is assumed that the physical resource mapped to a cooperative cell is variable. Therefore, the foregoing step needs to be performed on every occasion of transmitting signals. If the physical resource mapped to a cooperative cell is fixed, the physical resource coordination mode may be configured in the network planning, and the step of negotiating the coordination mode on every occasion of transmitting signals may be omissible.

This step needs to be completed before the downlink signals are transmitted to the UE in step 207, and may occur at the same time of steps 202-206 or after steps 202-206.

Step 202: The first cooperative cell determines the mapping rule used by it when the status of the CoMP transmission of the UE changes, where the mapping rule includes the number of and the positions of OFDM symbols allocated to a PDCCH domain and/or a data channel domain.

The change of the CoMP transmission status of the UE includes: change from a non-CoMP state to a CoMP state, or change from a CoMP state to a non-CoMP state.

Step 203: The first cooperative cell obtains the mapping rule used by the second cooperative cell for transmitting downlink signals.

The first cooperative cell obtains the mapping rule used by the second cooperative cell for transmitting downlink signals. The mapping rule includes the number of and the positions of OFDM symbols allocated to a PDCCH domain and/or a data channel domain. The mapping rule may also be obtained through an interface for exchanging data between cells, and this interface can also transmit relevant negotiation information, including other information such as PDCCH and antenna configuration.

For example, the obtained mapping rule reveals that the second cooperative cell uses the 1st-3rd OFDM symbols to transmit downlink signaling, and uses the 4th-14th OFDM symbols to transmit downlink data.

Step 204: Comparison is made between the obtained number of symbols and the number of OFDM symbols allocated by the first cooperative cell to the PDCCH domain.

The first cooperative cell uses the 1st-2nd OFDM symbols to transmit downlink signaling, and uses the 3rd-14th OFDM symbols to transmit downlink data.

Step 205: When the number of symbols allocated to the PDCCH domain is less than the number of the obtained symbols, the first cooperative cell sets the OFDM symbols to be unoccupied after allocating the OFDM symbols to the PDCCH domain. The number of the unoccupied symbols is the difference between the number of OFDM symbols of this cell and the number of obtained OFDM symbols.

The new OFDM symbols generated after the unoccupied OFDM symbols are set serve as the mapping rule of the first cooperative cell that has a smaller number of OFDM symbols, and the existing mapping rule of the second cooperative cell serves as the mapping rule of the second cooperative cell.

Figure 3:
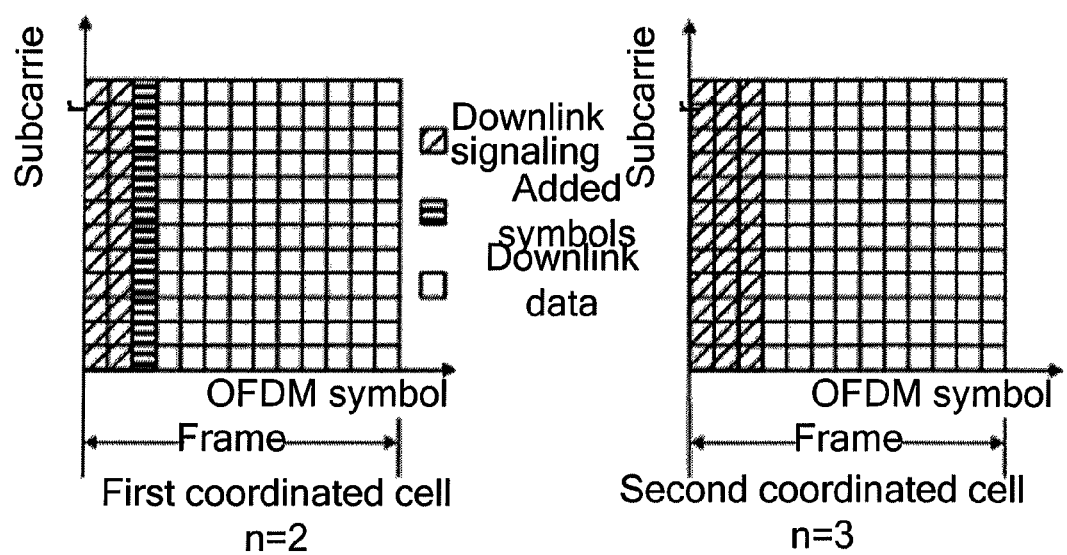
FIG. 3 shows how to set OFDM symbols to be unoccupied in downlink signals in Embodiment 2 of the present invention.

The comparison result generated in step 204 is: The first cooperative cell uses two OFDM symbols to transmit downlink signaling, and the second cooperative cell uses three OFDM symbols to transmit downlink signaling. The number of symbols of the downlink signaling transmitted by the first cooperative cell is less than that by the second cooperative cell, and the difference is 3−2=1. Therefore, 1 OFDM symbol is set to be unoccupied after this cell allocates the OFDM symbols to the PDCCH domain. In this way, both cooperative cells use the 4th-14th OFDM symbols to transmit downlink data. FIG. 3 shows how to set OFDM symbols to be unoccupied in an embodiment of the present invention.

A unoccupied OFDM symbol means that the first cooperative cell does not place any data in the OFDM symbol. The number of the unoccupied OFDM symbols is the difference between the number of symbols of the first cooperative cell and the number of symbols of the second cooperative cell. In this way, the positions of the OFDM symbols used by the downlink data channel domain of one cooperative cell are the same as the positions of the OFDM symbols used by the downlink data channel domain of the other, the UE can process the signal and obtain the downlink data.

The downlink data carried in the downlink data channel domain of different cooperative cells may be the same data, which enhances the strength of the signals received by the UE; or, the downlink data carried in the downlink data channel domain in different cooperative cells may be different so that the UE can receive multiple channels of signals.

Step 206: Notify the mapping rule of each cooperative cell to the UE.

The first cooperative cell and the second cooperative cell notify their respective selected mapping rules to the corresponding UE. The notification may be sent through a PDCCH or a broadcast channel. The UE may be a single UE or a group of UEs.

In the foregoing step 206, notifying the mapping rule to the corresponding UE means that the cooperative cell selects a different UE for receiving the notification according to the setting on the network side. The setting on the network side may be: The cooperative cell executes the notification to the UE in the CoMP state and the UE in the non-CoMP state according to the mapping rule of the CoMP mode, or the cooperative cell executes the notification to the UE in the CoMP state according to the mapping rule of the CoMP mode, and executes the notification to the UE in the non- CoMP state according to the general mapping rule. That is, the network may notify both the UE in the CoMP state and the UE in the non-CoMP state, or notify only the UE in the CoMP state.

Step 207: Downlink signals are transmitted to the UE.

The UE may resolve the downlink signals sent by each cooperative cell according to the received mapping rule, and obtain the corresponding downlink data.

In this embodiment, the cooperative cell that allocates a smaller number of OFDM symbols to the PDCCH domain sets the OFDM symbol to be unoccupied after this cell allocates the OFDM symbols to the PDCCH domain; before the downlink signals are transmitted, the physical resource mapping rule used by each cooperative cell in CoMP transmission is negotiated, and therefore, the UE can handle the scenario that each different cooperative cell allocates a different number of OFDM symbols to the PDCCH domain, and the CoMP transmission performance of the system is improved.

When the PDCCH occupies different numbers of symbols, which leads to different numbers of symbols available to data transmission, as shown in FIG. 3 that illustrates the OFDM symbol allocation in two cooperative cell subframes, the rule of mapping from the transmission block to the physical resource is as follows:

It is assumed that the first cooperative cell (exclusive of the first two control symbols) can transmit 120 data, the second cooperative cell (exclusive of the first three control symbols) can transmit 110 data, and each symbol can transmit 10 data, the following code rate matching scheme is applicable:

After one transmission block undergoes rate matching, 110 data are obtained. This 110 data are carried in the counterpart positions that can transmit data in the first cooperative cell, where the counterpart positions correspond to the positions in the second cooperative cell. The data in the counterpart position of the first cooperative cell may be the same as or different from the data in the counterpart position of the second cooperative cell. The third symbol of the first cooperative cell may carry a specified part of data in the 110 data.

Alternatively, after one transmission block undergoes rate matching, 120 data are obtained. Among 120 data, 110 data are carried in the counterpart positions that can transmit data in the first cooperative cell, where the counterpart positions correspond to the positions in the second cooperative cell. The data in the counterpart position of the first cooperative cell may be the same as or different from the data in the counterpart position of the second cooperative cell. The third symbol of the first cooperative cell may carry the remaining 10 data. For other scenarios in which the resources do not match between cooperative cells, the method similar to the method above may be applied.

For example, two cells use different code rate matching schemes, the rate matching scheme in the existing LTE may be applied, or different methods of mapping to physical resources may be applied.

In Embodiment 3 below, it is assumed that the physical resources in a mapping relation with the cooperative cell are fixed, and the unoccupied OFDM symbols of the first cooperative cell are allocated to the PDCCH domain or the data channel domain. In the case that the physical resources in a mapping relation with the cooperative cell are variable, the UE can resolve the downlink signals correctly according to the received mapping rule only if the coordination mode is negotiated before every occasion of sending the downlink signals.

Embodiment 3

Figure 4:
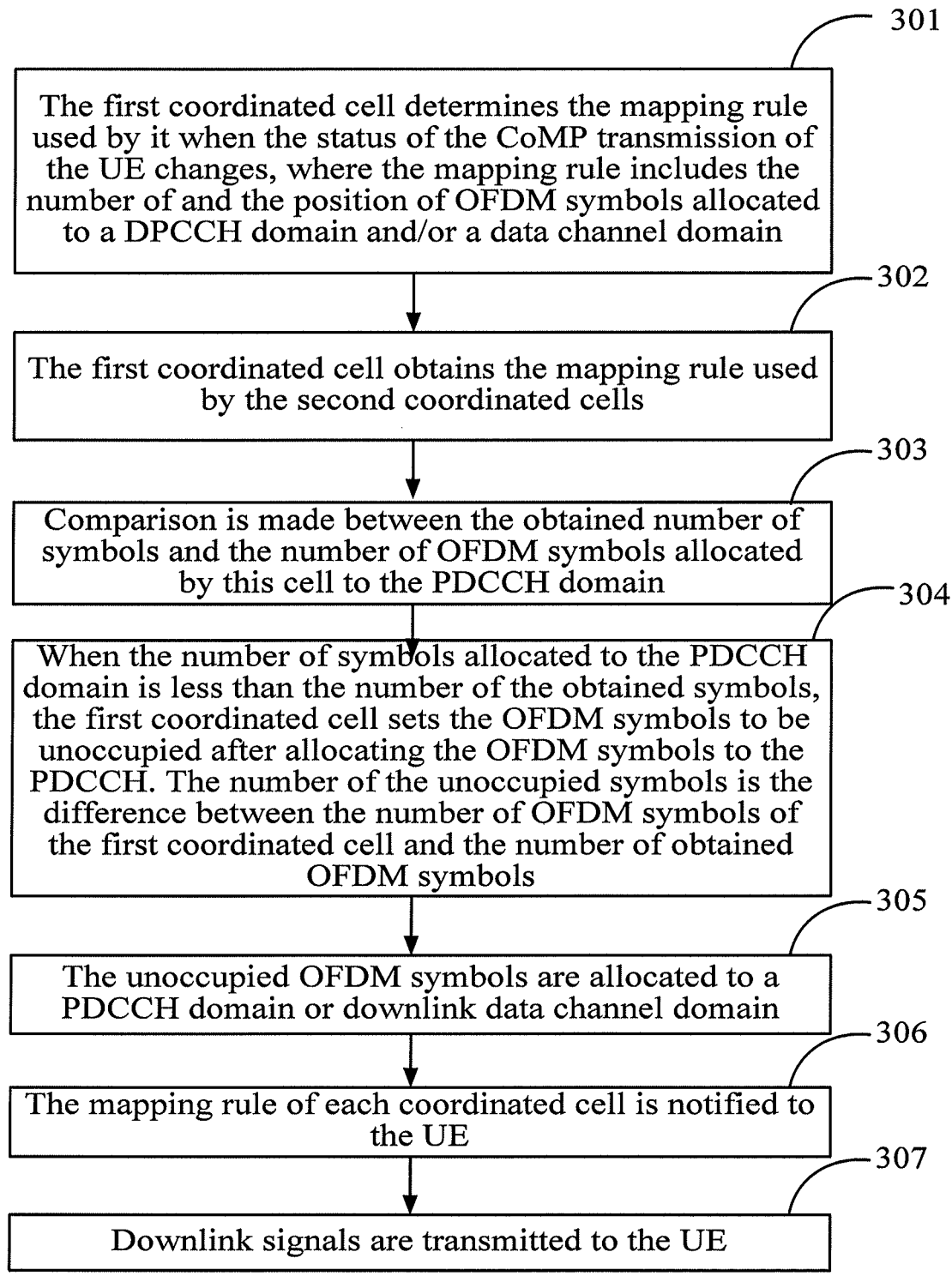
FIG. 4 is a flowchart of a method in Embodiment 3 of the present invention.

FIG. 4 is a flowchart of a method in this embodiment. Steps 301-304 in this embodiment are the same as steps 202-205 in Embodiment 2.

Step 305: The unoccupied OFDM symbols are allocated to a PDCCH domain or downlink data channel domain.

If the unoccupied OFDM symbols are allocated to the PDCCH domain, the OFDM symbols may carry the relevant control information of the downlink signaling, for example, downlink signaling or common reference signals; if the unoccupied OFDM symbols are allocated to the downlink data channel domain, the OFDM symbols may carry the redundancy information of the downlink data, or HARQ data, or the part of data carried in the data domain, or UE-specific RSs.

After the unoccupied OFDM symbols are allocated to the data channel domain or PDCCH domain, the number and position of the generated new OFDM symbols serve as the mapping rule of the first cooperative cell that has a smaller number of OFDM symbols, and the existing mapping rule of the second cooperative cell that has a larger number of OFDM symbols serves as the mapping rule of the second cooperative cell.

Step 306: Notify the mapping rule of each cooperative cell to the UE.

Step 307: Transmit downlink signals to the UE.

The UE may resolve the downlink signals sent by each cooperative cell according to the received mapping rule, and obtain the corresponding downlink data.

In this embodiment, the cooperative cell that allocates a smaller number of OFDM symbols to the PDCCH domain sets the OFDM symbols to be unoccupied after this cell allocates the OFDM symbols to the PDCCH domain; and the unoccupied OFDM symbols may be allocated to the PDCCH domain or downlink data channel domain. Before the downlink signals are transmitted, the physical resource mapping rule used by each cooperative cell in CoMP transmission is negotiated, and therefore, the UE can handle the scenario that each different cooperative cell allocates a different number of OFDM symbols to the PDCCH domain, and the CoMP transmission performance of the system is improved.

In practice, there may be more than one second cooperative cell. In Embodiment 4 below, it is assumed that there are two second cooperative cells. Nevertheless, there may be more than two second cooperative cells.

Embodiment 4

Figure 5:
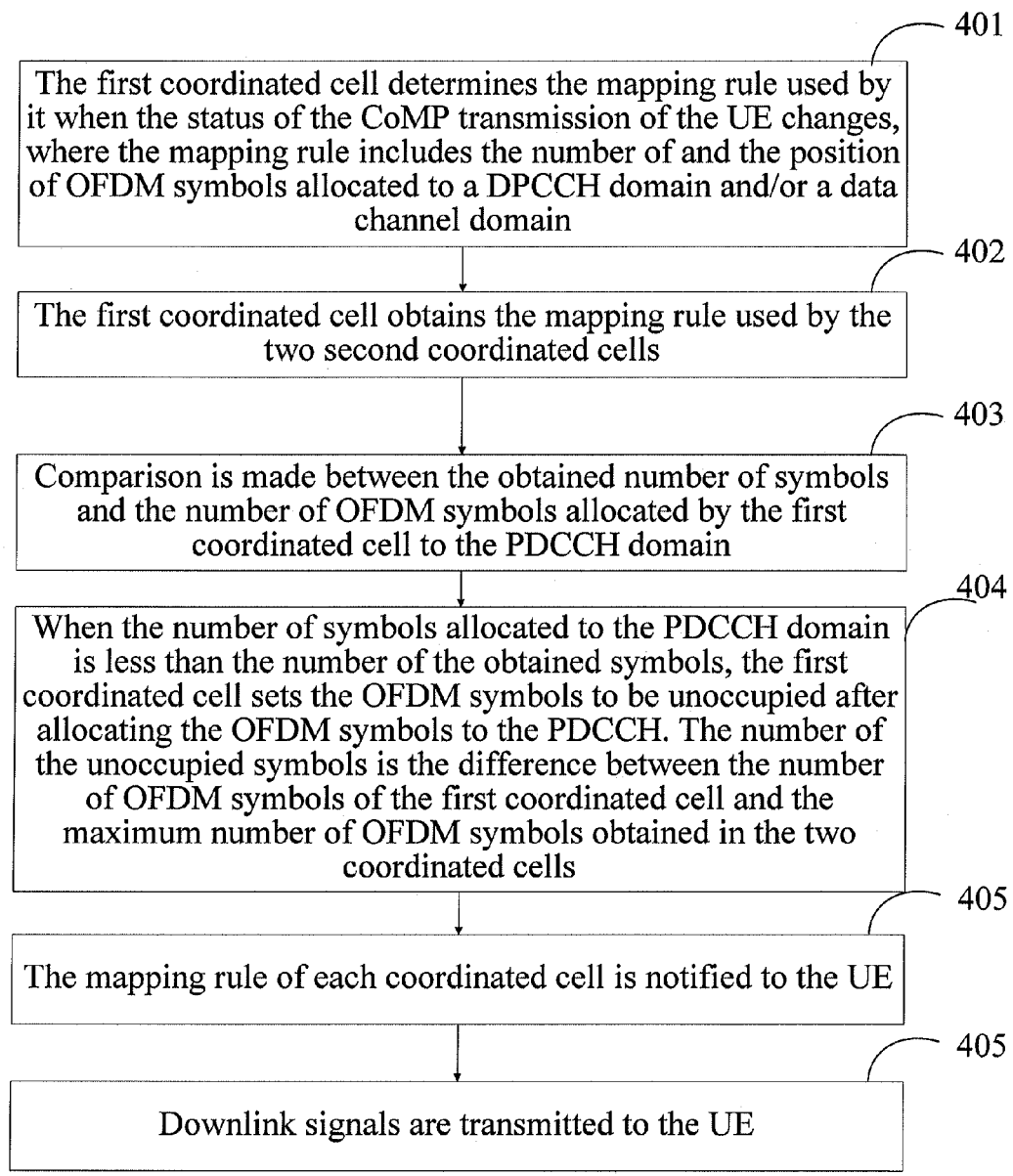
FIG. 5 is a flowchart of a method in Embodiment 4 of the present invention.

FIG. 5 is a flowchart of a method in this embodiment.

Step 401: When the CoMP transmission status of the UE changes, the first cooperative cell determines the mapping rule used by the first cooperative cell for CoMP transmission.

As mentioned above, the mapping rule includes the number of and the positions of OFDM symbols allocated to the PDCCH domain and/or data channel domain.

The mapping rule used by the first cooperative cell is determined as: The 1st-2nd OFDM symbols are allocated to the PDCCH domain, and the 3rd-14th OFDM symbols are allocated to the downlink data channel domain.

Step 402: The first cooperative cell obtains the mapping rule used by the two second cooperative cells.

The first cooperative cell obtains the mapping rule used by the two second cooperative cell for transmitting downlink signals. The mapping rule includes the number of and/or the positions of OFDM symbols allocated to a PDCCH domain and/or a data channel domain. The mapping rule may also be obtained through an interface for exchanging data between cells, and this interface can also transmit relevant negotiation information, including other information such as PDCCH and antenna configuration.

For example, the obtained mapping rule is: The first second cooperative cell allocates the 1st-3rd OFDM symbols to the PDCCH domain, and allocates the 4th-14th OFDM symbols to the downlink data channel domain; the second second cooperative cell allocates the 1st-4th OFDM symbols to the PDCCH domain, and allocates the 5th-14th OFDM symbols to the downlink data channel domain.

Step 403: Comparison is made between the obtained number of symbols and the number of OFDM symbols allocated by the first cooperative cell to the PDCCH domain.

The comparison result is: The first cooperative cell allocates the second OFDM symbol to the PDCCH domain, and the first second cooperative cell allocates three OFDM symbols to the PDCCH domain, and the second cooperative cell allocates four OFDM symbols to the PDCCH domain. The number of symbols allocated by the first cooperative cell to the PDCCH domain is less than that allocated by the two second cooperative cells, and the maximum difference is 4−2=2.

Step 404: When the number of symbols allocated to the PDCCH domain is less than the number of the obtained symbols, the first cooperative cell sets the OFDM symbols to be unoccupied after allocating the OFDM symbols to the PDCCH domain.

Like the description above, the number of the unoccupied symbols is the difference between the number of OFDM symbols of this cell and the maximum number of obtained OFDM symbols in the two cooperative cells.

The new OFDM symbols generated after the null OFDM symbols are set serve as the mapping rule of the first cooperative cell that has a smaller number of OFDM symbols and the mapping rule of the first second cooperative cell, and the existing mapping rule of the second second cooperative cell that has the maximum number of OFDM symbols serves as the mapping rule of the second second cooperative cell.

The comparison result obtained in step 403 is: The number of symbols used by the first cooperative cell for transmitting downlink signaling is less than that used by the two second cooperative cells, and the maximum difference is 4−2=2. Therefore, two OFDM symbols are set to be unoccupied after this cell allocates the number of OFDM symbols to the PDCCH domain.

Figure 6:
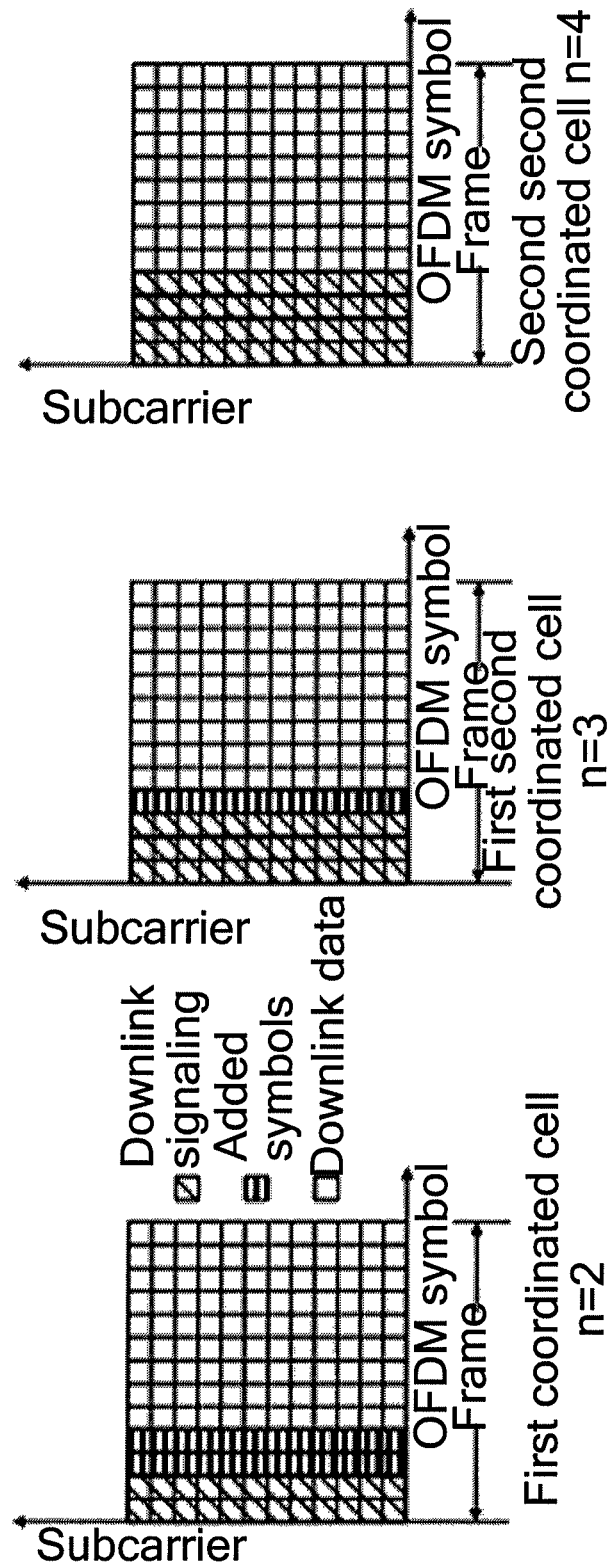
FIG. 6 shows how to set OFDM symbols to be unoccupied in downlink signals in Embodiment 4 of the present invention.

Likewise, after the first second cooperative cell obtains the mapping rule used by the second second cooperative cell for transmitting downlink signals, the first second cooperative cell obtains a comparison result that the number of symbols used by this cell for transmitting downlink signaling is less than that used by the second second cooperative cell, and the difference is 4−3=1. Therefore, one OFDM symbol is set to be unoccupied after this cell allocates the OFDM symbols to the PDCCH domain, and the first second cooperative cell also uses the 5th-14th OFDM symbols to transmit downlink data. FIG. 6 shows how to increase OFDM symbols in this embodiment.

In this way, all the three cooperative cells have allocated the 5th-14th OFDM symbols to the downlink data channel domain.

Evidently, if there are more than two second cooperative cells that perform CoMP transmission for the same UE, the first cooperative cell obtains and compares the mapping rules of all second cooperative cells that perform CoMP transmission for the same UE, and the mapping rule corresponding to the scenario of allocating the maximum number of OFDM symbols to the PDCCH domain serves as the mapping rule of the first cooperative cell.

Nevertheless, the unoccupied OFDM symbols may be further allocated to the PDCCH domain or downlink data channel domain, or do not carry any data.

The downlink data carried in different cooperative cells may be the same data, which enhances the strength of the signals received by the UE; or, the downlink data carried in different cooperative cells may be different so that the UE can receive multiple channels of signals.

Step 405: Notify the mapping rule of each cooperative cell to the UE.

Step 406: Transmit downlink signals to the UE.

The UE may resolve the downlink signals sent by each cooperative cell according to the received mapping rule, and obtain the corresponding downlink data.

In this embodiment, the cooperative cell that allocates a smaller number of OFDM symbols to the PDCCH domain sets the OFDM symbols to be unoccupied after this cell allocates the OFDM symbols to the PDCCH domain. The number of unoccupied symbols is the difference between the number of OFDM symbols of this cell and the maximum number of obtained OFDM symbols in at least two cooperative cells. Before the downlink signals are transmitted, the physical resource mapping rule used by each cooperative cell in CoMP transmission is negotiated, and therefore, the UE can handle the scenarios that each different cooperative cell allocates a different number of OFDM symbols to the PDCCH domain, and the CoMP transmission performance of the system is improved.

It is worthy of attention that: For ease of description in the method embodiments described above, the method is described as a series of operations. Those skilled in the art are aware that the embodiments of the present invention are not limited to the order of operations described, and certain steps may occur in different order, or occur simultaneously. Secondly, those skilled in the art are aware that the embodiments described here are preferred embodiments, and the involved operations and modules are not mandatory.

In the foregoing embodiments, each embodiment has its own emphasis, and the part not detailed in one embodiment may be detailed in another embodiment.

Described above is a method for determining resource mapping in CoMP transmission. In addition, a network device is provided in an embodiment of the present invention.

Figure 7:
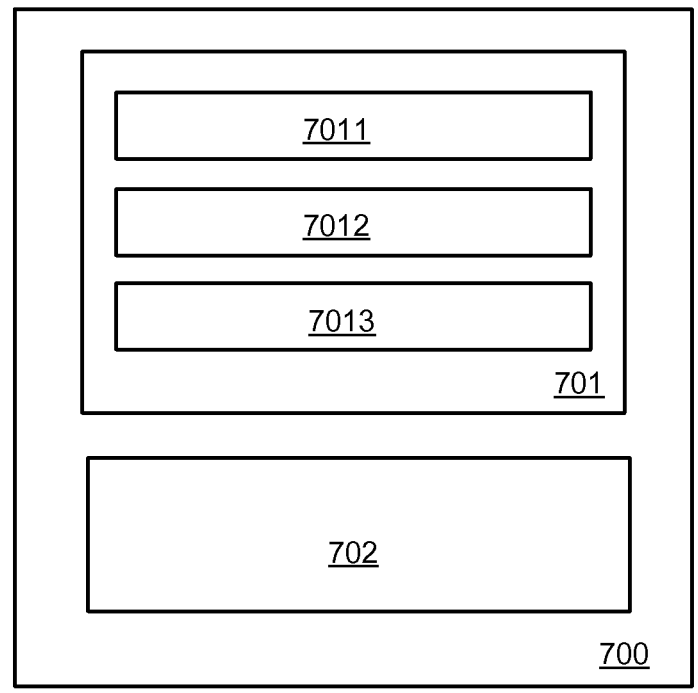
FIG. 7 shows a structure of a network device in an embodiment of the present invention.

A network device 700 may determine the resource mapping in CoMP transmission. FIG. 7 shows a structure of a network device in an embodiment of the present invention. The network device includes:

a coordinating unit 701, adapted to negotiate a mapping rule used by cooperative cells that perform CoMP transmission for a UE when status of the CoMP transmission of the UE changes, where the mapping rule includes the number of and the positions of OFDM symbols allocated to a PDCCH domain and/or a data channel domain, where:

the negotiation method may be: the same mapping rule is applied to all cooperative cells; or any other negotiation method that enables normal communication between the cooperative cells is applied; and a notifying unit 702, adapted to notify the mapping rule negotiated by the negotiating unit 701 to the UE.

The negotiating unit 701 includes:

a comparing unit 7011, adapted to compare the numbers of OFDM symbols allocated by each cooperative cell to the PDCCH domain; and a unoccupied symbol setting unit 7012, adapted to: set the OFDM symbols to be unoccupied after the comparing unit 7011 obtains a comparison result that a cooperative cell other than the cooperative cell with the maximum number of OFDM symbols allocates OFDM symbols to the PDCCH domain, use the number and position of the new OFDM symbols with the unoccupied OFDM symbols as the mapping rule of the cooperative cell with the smaller number of OFDM symbols, and use the existing mapping rule of the cooperative cell with the maximum number of OFDM symbols as the mapping rule of the cooperative cell with the maximum number of OFDM symbols, where the number of unoccupied symbols is the difference between the number of OFDM symbols of the other cooperative cell and the maximum number of OFDM symbols obtained through comparison.

Alternatively, the negotiating unit 701 includes:
a comparing unit 7011, adapted to compare the numbers of OFDM symbols allocated by each cooperative cell to the PDCCH domain; and
a symbol allocating unit 7013, adapted to: allocate the unoccupied OFDM symbols to the data channel domain or PDCCH domain after the comparing unit 7011 obtains a comparison result that a cooperative cell other than the cooperative cell with the maximum number of OFDM symbols allocates OFDM symbols to the PDCCH domain, use the number and position of the new OFDM symbols after the allocation as the mapping rule of the cooperative cell with the smaller number of OFDM symbols, and use the existing mapping rule of the cooperative cell with the maximum number of OFDM symbols as the mapping rule of the cooperative cell with the maximum number of OFDM symbols, where the number of unoccupied symbols is the difference between the number of OFDM symbols of the other cooperative cell and the maximum number of OFDM symbols obtained through comparison.

Alternatively, the negotiating unit 701 further includes:
an RS negotiating unit, adapted to negotiate whether data is sent from the position of the RS of each cooperative cell, and/or negotiate the sending mode of the RS of each cooperative cell; and/or
a unit for negotiating code rate matching scheme, adapted to negotiate the code rate matching scheme used by each cooperative cell; and/or
a unit for negotiating use of multicast broadcast single-frequency network subframe, adapted to negotiate whether each cooperative cell uses a multicast broadcast single-frequency network subframe and/or the mapping rule of the multicast broadcast single-frequency network subframe; and/or
a coordination mode negotiating unit, adapted to negotiate the coordination mode used by each cooperative cell, where the coordination mode includes a resource coordination mode and a receiving and transmitting mechanism.

A communication system is provided in an embodiment of the present invention. The communication system can determine resource mapping in CoMP transmission. The communication system includes:
a network device, adapted to: negotiate a mapping rule used by cooperative cells that perform CoMP transmission for a UE when status of the CoMP transmission of the UE changes, where the mapping rule includes the number of and the positions of OFDM symbols allocated to a PDCCH domain and/or a data channel domain, and notify the negotiated mapping rule to the UE.

The network device is further adapted to: compare the number of OFDM symbols allocated by each cooperative cell to the PDCCH domain, and set the OFDM symbols to be unoccupied after the cooperative cell with a smaller number of OFDM symbols allocates the OFDM symbols to the PDCCH domain, where the number of the null symbols is the difference between the number of OFDM symbols of the cooperative cell with a smaller number of OFDM symbols and the maximum number of OFDM symbols obtained through comparison.

In this embodiment, before the downlink signals are transmitted, the mapping rule used by each cooperative cell for CoMP transmission is negotiated, and therefore, the UE can accurately receive the signal sent by multiple cooperative cells and the performance of CoMP transmission in the system is improved.

The negotiation of the mapping rule in this embodiment may be: The cooperative cell with a smaller number of OFDM symbols allocated to the PDCCH domain sets the OFDM symbols to be unoccupied after allocating the OFDM symbols to the PDCCH domain, and uses the new OFDM symbols generated after the unoccupied OFDM symbols are set as the mapping rule of the cooperative cell with a smaller number of OFDM symbols, and use the existing mapping rule of the cooperative cell with the maximum number of OFDM symbols as the mapping rule of the cooperative cell with the maximum number of OFDM symbols, in which the unoccupied OFDM symbols may be allocated to the PDCCH domain or downlink data channel domain. Therefore, the UE can handle the scenario that each cooperative cell allocates a different number of OFDM symbols to the PDCCH domain.

Persons of ordinary skill in the art should understand that all or part of the steps of the method under the present invention may be implemented by a program instructing relevant hardware. The program may be stored in a computer readable storage medium. When the program runs, the steps of the method under the present invention are performed. The storage medium may be a magnetic disk, Compact Disk (CD), Read-Only Memory (ROM), or Random Access Memory (RAM).

Elaborated above are a method, a network device, and a system for determining resource mapping in CoMP transmission in an embodiment of the present invention. Although the invention is described through some exemplary embodiments, the invention is not limited to such embodiments. It is apparent that persons of ordinary skill in the art can make modifications and variations to the invention without departing from the spirit and scope of the invention. The invention is intended to cover the modifications and variations provided that they fall in the scope of protection defined by the following claims or their equivalents.

What is claimed is:

1. A method for determining resource mapping in Coordinated Multi-Point (CoMP) transmission, comprising:
    determining that a status of a CoMP transmission of a UE has changed;
    prior to downlink transmission to the UE, negotiating, by cooperative cells, mapping rules used by the cooperative cells to perform CoMP transmission for a User Equipment UE, wherein the mapping rules comprise the number of and position of Orthogonal Frequency Division Multiplexing (OFDM) symbols allocated to a Physical Downlink Control Channel (PDCCH) domain and/or a data channel domain; and
    after the mapping rules are negotiated, communicating the negotiated mapping rule to the UE.

2. The method of claim 1, wherein the negotiating the mapping rules used by the cooperative cells that perform CoMP transmission for the UE comprises:
    comparing the numbers of the OFDM symbols allocated by each cooperative cell to the PDCCH domain;
    by a cooperative cell other than the cooperative cell with a maximum number of OFDM symbols allocated to the PDCCH domain, setting OFDM symbols to be unoccupied after allocating the OFDM symbols to the PDCCH domain, wherein the number of unoccupied symbols is the difference between the number of OFDM symbols of the other cooperative cell and the number of OFDM symbols of the cooperative cell with the maximum number of OFDM symbols allocated to the PDCCH domain;

by a cooperative cell other than the cooperative cell with a maximum number of OFDM symbols allocated to the PDCCH domain, using the number and position of new OFDM symbols with the unoccupied OFDM symbols as a mapping rule of the cooperative cell;

and using an existing mapping rule of the cooperative cell with the maximum number of OFDM symbols allocated to the PDCCH domain as the mapping rule of the cooperative cell with the maximum number of OFDM symbols allocated to the PDCCH domain.

3. The method of claim 1, wherein:
the negotiating the mapping rules further comprises: negotiating a sending mode of RSs, of each cooperative cell.

4. The method of claim 3, wherein the negotiating the sending mode of the RSs of each cooperative cell comprises:
negotiating the RSs of each cooperative cell so that the RSs correspond to a CoMP-ID, a UE-ID, an anchor cell ID, or a serving cell ID, or any combination thereof.

5. The method of claim 1, wherein:
the negotiating the mapping rule further comprises: negotiating whether positions of RSs of each cooperative cell are utilized to send data.

6. The method of claim 5, wherein the negotiating whether data is sent from the positions of the RSs of each cooperative cell comprises:
by all cooperative cells, using a mapping rule of mapping from a transmission block to a physical resource, which is the same as the mapping rule of an anchor cell, and sending no data from the position of the RS corresponding to the anchor cell;

or, by Resource Elements, REs, in counterpart time-frequency positions of the cooperative cells, sending same data, wherein a rule applied to the position occupied by the RS depends on characteristics of the RS of the cooperative cell: when the cooperative cell has a corresponding RS, this RS is paired with the corresponding RE for sending the same data, or no data is sent from the position occupied by this RS; when the cooperative cell has no corresponding RS, the cooperative cell that sends no RS send data or not in the counterpart position for sending the RS in other cooperative cells; or sending data from the corresponding time-frequency resource positions of all cooperative cells, including the position of the RS.

7. The method of claim 6, wherein:
the anchor cell is preset by a system, or allocated dynamically according to status of a service or a channel, or the anchor cell is a cell from which the UE receives control signaling, or a cell selected by the UE.

8. The method of claim 1, wherein:
the negotiating the mapping rule further comprises: negotiating a code rate matching scheme used by each cooperative cell.

9. The method of claim 8, wherein negotiating the code rate matching scheme used by each cooperative cell comprises:
when all cooperative cells have the same number of and the same positions of Resource Elements, REs, that can send data, applying the same code rate matching scheme; or when the cooperative cells have different number of and/or different positions of the REs that can send data, applying the same code rate matching scheme, and then deciding a mode of mapping from a rate-matched OFDM symbol to a physical resource according to a mapping relation of REs and/or the number of the REs that can send data in the cooperative cells; or when the cooperative cells have different number of and/or different positions of the REs that can send data, applying the same code rate matching scheme, and then deciding the mode of mapping from the rate-matched OFDM symbol to the physical resource according to the mapping relation of the REs and/or the number of the REs that can send data in the cooperative cell; for the data corresponding to the REs that involve no mapping relation between the cooperative cells, matching the data in a corresponding alternation mode, duplicate mode, or puncture mode; or using, by the cooperative cells, different code rate matching schemes, and using different rules of mapping from the rate-matched OFDM symbol to the physical resource, by each cooperative cell.

10. The method of claim 1, further comprising:
by the cooperative cells that perform CoMP transmission for the UE, negotiating use of a multicast broadcast single-frequency network subframe or use of a subframe whose mapping rule is the same as the mapping rule of the multicast broadcast single-frequency subframe.

11. The method of claim 10, wherein negotiating use of the multicast broadcast single-frequency network subframe, by the cooperative cells that perform CoMP transmission for the UE comprises:
after the multicast broadcast single-frequency network subframe is extended, negotiating use of the extended multicast broadcast single-frequency network subframe, by the cooperative cells that perform CoMP transmission for the UE.

12. The method of claim 11, wherein the extending the multicast broadcast single-frequency network subframe comprises:
prolonging length of a Cyclic Prefix (CP) in use, increasing the OFDM symbols occupied by the PDCCH, enhancing density of Reference Signal, RS, patterns and pilot frequencies, or increasing contents sent by the PDCCH, or any combination thereof.

13. The method of claim 12, further comprising:
indicating type of the subframe for CoMP transmission in a downlink signaling, and/or indicating the length of the CP used in a corresponding uplink subframe in a broadcast signaling and/or a control channel.

14. The method according to claim 10, wherein:
in non-backhaul transmission of a relay scenario, by the cooperative cells that perform CoMP transmission for the UE, negotiating the mapping rule used by the cooperative cells.

15. The method of claim 1, further comprising:
by the cooperative cells that perform CoMP transmission for the UE, negotiating a coordination mode to be applied, wherein the coordination mode comprises a resource coordination mode and a receiving and transmitting mechanism; and notifying the negotiated coordination mode to the UE.

16. The method of claim 15, wherein negotiating the resource coordination mode used by the cooperative cells, by the cooperative cells that perform CoMP transmission for the UE comprises: by the cooperative cells that perform CoMP transmission for the UE, negotiating the coordination mode to be used by the cooperative cells as a fixed or variable resource coordination mode, wherein:
the variable resource coordination mode comprises: resources for coordination are all resources of the cooperative cells, resources corresponding to the UE, or resources specified for performing CoMP transmission; or the fixed resource coordination mode comprises: a data domain of the cooperative cells uses physical resources other than control channel symbols, and the number of the control channel symbols is the maximum possible number of symbols occupied by the PDCCH.

17. The method of claim 1, wherein the change of the CoMP transmission status of the UE comprises:

the CoMP transmission status of the UE in the CoMP transmission state in the cell which is in the CoMP transmission state changes; or the CoMP transmission status of the UE in a non-CoMP transmission state in the cell which is in the CoMP transmission state changes; or the CoMP transmission status of the UE in the CoMP transmission state in the cell which is in the non-CoMP transmission state changes; or any combination thereof.

18. A method for determining resource mapping in Coordinated Multi-Point (CoMP) transmission, comprising:

negotiating mapping rules used by cooperative cells that perform CoMP transmission for a User Equipment UE when a status of the CoMP transmission of the UE changes, wherein the mapping rules comprise the number of and position of Orthogonal Frequency Division Multiplexing (OFDM) symbols allocated to a Physical Downlink Control Channel (PDCCH), domain and/or a data channel domain; and notifying the negotiated mapping rule to the UE;

wherein the negotiating the mapping rules used by the cooperative cells, by the cooperative cells that perform CoMP transmission for the UE comprises:

comparing the number of the OFDM symbols allocated by each cooperative cell to the PDCCH domain;

by a cooperative cell other than the cooperative cell with a maximum number of OFDM symbols allocated to the PDCCH domain, setting the OFDM symbols to be unoccupied after allocating the OFDM symbols to the PDCCH domain, wherein the number of unoccupied symbols is the difference between the number of OFDM symbols allocated to the PDCCH domain of the other cooperative cell and the number of OFDM symbols of the cooperative cell with the maximum number;

by a cooperative cell other than the cooperative cell with a maximum number of OFDM symbols allocated to the PDCCH domain, allocating the unoccupied OFDM symbols to the data channel domain or the PDCCH domain;

by a cooperative cell other than the cooperative cell with a maximum number of OFDM symbols allocated to the PDCCH domain, using the number and position of new OFDM symbols after the allocation as a mapping rule of this cooperative cell;

and using an existing mapping rule of the cooperative cell with the maximum number of OFDM symbols allocated to the PDCCH domain as the mapping rule of the cooperative cell with the maximum number of OFDM symbols.

19. The method of claim 18, wherein the allocating the unoccupied OFDM symbols to the data channel domain comprises:

allocating the unoccupied OFDM symbols to the data channel domain for transmitting Hybrid Automatic Repeat Request, HARQ, data, or for transmitting part of data transmitted by a data domain, or for transmitting UE-specific RSs;

or, the allocating the unoccupied OFDM symbols to the PDCCH domain comprises: allocating the unoccupied OFDM symbols to the PDCCH domain for transmitting downlink signaling or common RSs.

20. A network device, comprising:

a coordinating unit configured to negotiate mapping rules used by cooperative cells that perform Cooperative Multi-Point (CoMP) transmission for a User Equipment (UE) when status of the CoMP transmission of the UE changes, wherein the mapping rule comprises the number of and position of Orthogonal Frequency Division Multiplexing (OFDM) symbols allocated to a Physical Downlink Control Channel (PDCCH), domain and/or a data channel domain; and a notifying unit configured to notify the mapping rule negotiated by the negotiating unit to the UE, wherein the negotiating unit comprises:

a comparing unit configured to compare the number of the OFDM symbols allocated by each cooperative cell to the PDCCH domain; and an unoccupied symbol setting unit, configured to:

set the OFDM symbols to be unoccupied after the comparing unit obtains a comparison result that a cooperative cell other than the cooperative cell with the maximum number of OFDM symbols allocated to the PDCCH domain, wherein the number of unoccupied symbols is the difference between the number of OFDM symbols allocated to the PDCCH domain of the other cooperative cell and the number of OFDM symbols of the cooperative cell with the maximum number of OFDM symbols allocated to the PDCCH domain;

use the number and position of new OFDM symbols with the unoccupied OFDM symbols as the mapping rule of this cooperative cell; and use the existing mapping rule of the cooperative cell with the maximum number of OFDM symbols allocated to the PDCCH domain as the mapping rule of the cooperative cell with the maximum number of OFDM symbols.

21. The network device of claim 20, wherein the negotiating unit further comprises:

an RS negotiating unit, configured to negotiate whether positions of RSs of each cooperative cell are utilized to send data, and/or negotiate a sending mode of the RSs of each cooperative cell; or a unit for negotiating code rate matching scheme, configured to negotiate a code rate matching scheme used by each cooperative cell; or a unit for negotiating use of multicast broadcast single-frequency network subframe, configured to negotiate whether each cooperative cell uses a multicast broadcast single-frequency network subframe and/or the mapping rule of the multicast broadcast single-frequency network subframe; or a coordination mode negotiating unit, configured to negotiate a coordination mode used by each cooperative cell, wherein the coordination mode comprises a resource coordination mode and a receiving and transmitting mechanism;

or any combination thereof.

22. A network device comprising:

a coordinating unit configured to negotiate mapping rules used by cooperative cells that perform Cooperative Multi-Point (CoMP) transmission for a User Equipment (UE) when status of the CoMP transmission of the UE changes, wherein the mapping rule comprises the number of and position of Orthogonal Frequency Division Multiplexing (OFDM) symbols allocated to a Physical Downlink Control Channel (PDCCH), domain and/or a data channel domain; and a notifying unit configured to notify the mapping rule negotiated by the negotiating unit to the UE, wherein the negotiating unit comprises:
- a comparing unit, configured to compare the numbers of the OFDM symbols allocated by each cooperative cell to the PDCCH domain; and
- a symbol allocating unit, configured to: allocate the unoccupied OFDM symbols to the data channel domain or the PDCCH domain after the comparing unit obtains a comparison result that a cooperative cell other than the cooperative cell with the maximum number of OFDM symbols allocates the OFDM symbols to the PDCCH domain, use the number and position of new OFDM symbols after the allocation as the mapping rule of this cooperative cell, and use the existing mapping rule of the cooperative cell with the maximum number of OFDM symbols as the mapping rule of the cooperative cell with the maximum number of OFDM symbols, wherein the number of unoccupied symbols is the difference between the number of OFDM symbols of the other cooperative cell and the number of OFDM symbols of the cooperative cell with the maximum number of OFDM symbols.

* * * * *